US005592631A

United States Patent [19]
Kelly et al.

[11] Patent Number: 5,592,631
[45] Date of Patent: Jan. 7, 1997

[54] BUS TRANSACTION REORDERING USING SIDE-BAND INFORMATION SIGNALS

[75] Inventors: James D. Kelly, Aptos; R. Stephen Polzin, Morgan Hill, both of Calif.

[73] Assignee: Apple Computer, Inc., Cupertino, Calif.

[21] Appl. No.: 432,620

[22] Filed: May 2, 1995

[51] Int. Cl.$^6$ ................................................. G06F 13/366
[52] U.S. Cl. ................................................. 395/293
[58] Field of Search ............................ 395/290, 200.05, 395/292, 293, 496, 859

[56] References Cited

U.S. PATENT DOCUMENTS

| | | | |
|---|---|---|---|
| 4,181,974 | 1/1980 | Lemay et al. | 395/200.01 |
| 4,473,880 | 9/1984 | Budde et al. | 395/292 |
| 4,965,716 | 10/1990 | Sweeney | 395/292 |
| 5,191,649 | 3/1993 | Cadambi et al. | 395/200.05 |
| 5,257,356 | 10/1993 | Brockmann et al. | 395/290 |
| 5,287,477 | 2/1994 | Johnson et al. | 395/484 |
| 5,327,538 | 7/1994 | Hamaguchi et al. | 364/DIG. 2 |
| 5,345,562 | 9/1994 | Chen | 395/290 |
| 5,375,215 | 12/1994 | Hanawa et al. | 395/496 |
| 5,473,762 | 12/1995 | Kelly et al. | 395/287 |

*Primary Examiner*—Jack B. Harvey
*Assistant Examiner*—Xuong M. Chung-Trans
*Attorney, Agent, or Firm*—Burns, Doane, Swecker & Mathis

[57] ABSTRACT

The present invention, generally speaking, provides a system and method of decoupling the address and data buses of a system bus using side band information signals. A computer system with which the invention may be used has a system bus including an address bus and a data bus and has, operatively connected to said system bus, multiple master devices, including a microprocessor, and multiple slave devices. In accordance with one embodiment of the invention, the address bus and the data bus are decoupled by providing, in addition to signals carried by the system bus, first side-band signals including, for each master device besides the microprocessor, an address arbitration signal, and providing, in addition to signals carried by the system bus, second side-band signals including, for each slave device, an address termination signal, a data arbitration signal, and a read-ready signal indicating that a respective slave device has data to present on the system bus. An address arbitration vector is formed, composed of address arbitration signals for the master devices, an address termination vector is formed, composed of address termination signals for the slave devices, and a read-ready vector is formed, composed of read-ready signals for the slave devices. The address arbitration vector and the address termination vector are sampled. Using a queue structure having a front and a rear, pairs of address arbitration and address termination vectors sampled at different sampling times are queued. Given a pair of address arbitration and address termination vectors at the head of the queue structure and a subsequent, corresponding read-ready vector, a data arbitration signal is issued to one of the slave devices and one of the master devices, as a "paired data bus grant."

16 Claims, 7 Drawing Sheets

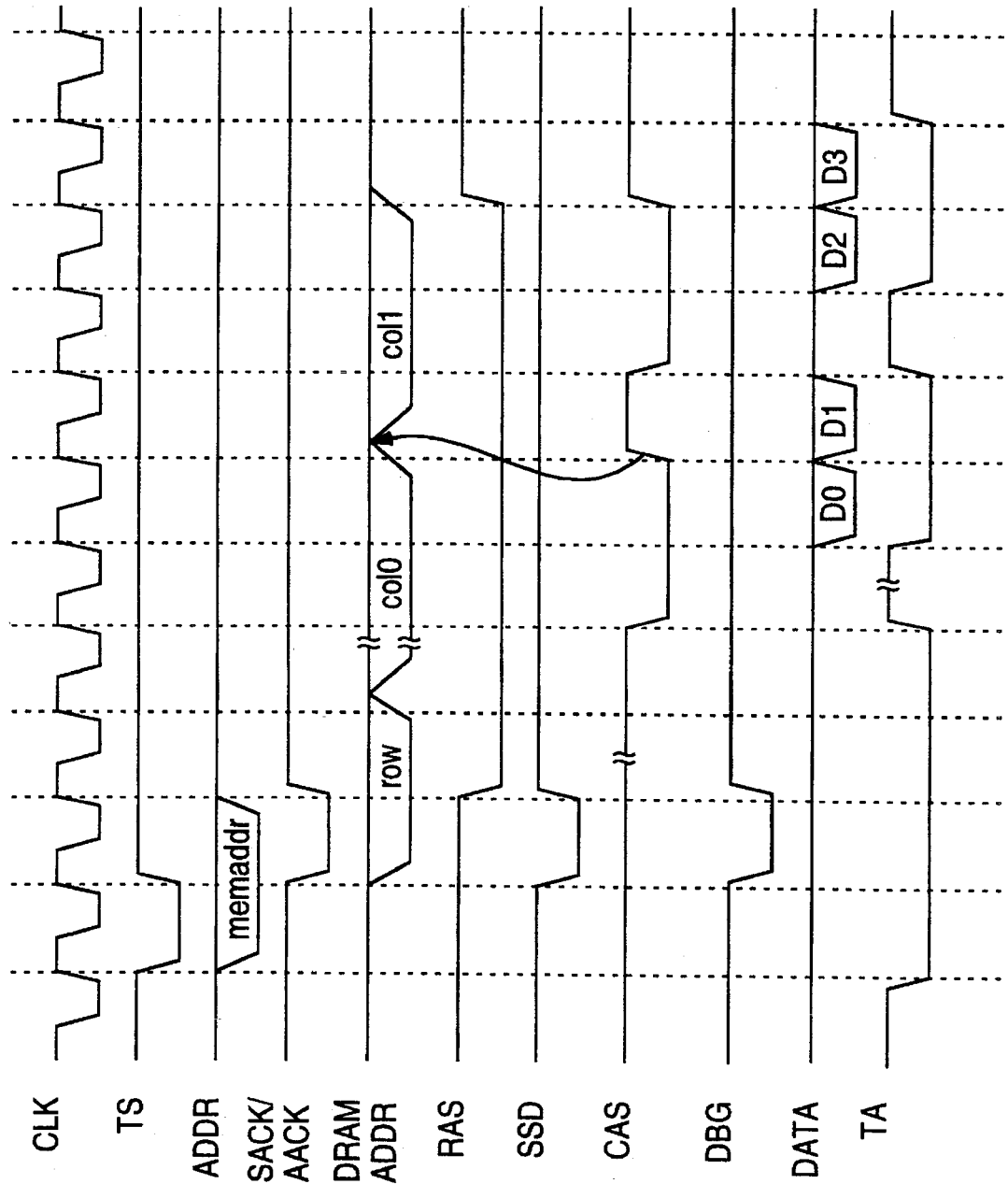

BUS TRANSACTION REORDERING USING SIDE-BAND INFORMATION SIGNALS

BACKGROUND OF THE INVENTION

1. Field of the Invention

The present invention relates to computer buses, and more particularly to bus utilization in small computer systems.

2. State of the Art

In computer systems, a bus is commonly used to communicate between logical blocks or devices. The devices connect to a common communications medium, such as a set of wires, or printed circuit board traces. The rules that govern the access of devices to the bus and data transfer on the bus constitute the bus protocol. Generally, all devices on a bus must use the same protocol In a typical bus implementation, a set of traces are embedded in one or more printed circuit boards. Devices connect to the bus through bus transceivers. Devices connected to a bus may all reside on the same primed circuit board. Such an arrangement is typical of small computer systems, i.e., personal computers and computer workstations. Alternatively, devices may reside on separate printed circuit boards and be attached to an electro-mechanical structure that incorporates the physical bus medium through a series of connectors. The physical bus medium, together with the electro-mechanical structure that incorporates it, is called the backplane bus. Such an arrangement is typical of minicomputers and mainframe computers.

A device connected to the bus may be a master, a slave, or both. A master uses the system bus to issue requests for service to one or more slaves. A slave uses the system bus to respond to requests for service from different masters. A device may at one time issue a request for service and at another time respond to a request for service, thereby functioning as eider a master or a slave.

A small computer system may have only a single bus master that, with relatively few exceptions, enjoys unrestricted access to the system bus. Until recent years, most personal computers were of this type. Alternatively, a computer system may have multiple bus masters that compete for access to the system bus through an arbitration process. Minicomputers and mainframe computers have used such a technique for many years. More recently, some personal computers have moved to a centralized bus arbitration scheme that permits other bus masters to take control of the system bus. In a typical PC, for example, bus masters may include a system microprocessor, processor-board DMA channels, and expansion-slot bus master devices. An arbitrating device detects any pending bus-access requests and grants access to one master at a time according to an arbitration scheme.

Conceptually, a typical computer system bus is divided into an address bus, a data bus, and a control bus. A bus transaction is a complete exchange between two bus devices. A bus transaction may have both an address phase during which address information is presented on the address bus and a data phase during which data information is presented on the data bus. Heretofore, any data phase was coordinated with a corresponding address phae. This sometimes is called a "single envelope" transaction. The PCI Bus specification calls for single envelope transactions. In certain other systems, the data phase of a bus transaction may follow the address phase of the same transaction in ordered succession, without any other data phase of any other bus transaction intervening. In such a case, the system bus is said to be tightly ordered. Small computer systems use, as a general rule, a tightly ordered system bus.

In minicomputer and mainframe computers, on the other hand, buses have often been loosely ordered such that between the address phase of a bus transaction and the corresponding data phase, other data phases of other bus transactions may occur. Alternatively, separate request and response transactions may be defined. For example, a read operation may be split into separate read request and read response transactions, allowing other bus traffic to use the system bus during the actual memory access.

The PowerPC™ computer architecture, co-developed by Apple Computer, represents a departure from prior-generation small computer architectures. PowerPC machines currently sold by Apple are based largely on the Motorola MPC601 RISC microprocessor. Other related processors, including the MPC 604, MPC 603, MPC 603e, and MPC 602 are currently available and additional related processors including the MPC 620 will be readily available in the future. The MPC60x family of microprocessors permits separate address bus tenures and data bus tenures, where tenure is defined as the period of bus mastership. In other words, rather than considering the system bus as an indivisible resource and arbitrating for access to the entire bus, the address and data buses are considered as separate resources, and arbitration for access to these two buses may be performed independently. A transaction, or complete exchange between two bus devices, is minimally comprised of an address tenure; one or more data tenures may also be involved in an exchange. There are two kinds of transactions: address/data and address-only.

A tenure consists of three phases: arbitration, transfer, and termination. During termination, a signal occurs that marks the end of the tenure. The same signal is used to acknowledge the transfer of an address or data beat. A beat corresponds generally to a particular state of the address bus or the data bus. Transfers include both single-beat transfers, in which a single piece of data is transferred, and burst data transfers, in which a burst of four data beats is transferred.

Referring more particularly to FIG. 1, note that the address and data tenures are distinct from one another and that both consist of three phases—arbitration, transfer, and termination. FIG. 1 shows a data transfer that consists of a single-beat transfer (up to 64 bits). In a four-beat burst transfer, by contrast, data termination signals are required for each beat of data, but re-arbitration is not required. Having independent address and data tenures allows address pipelining (indicated in FIG. 1 by the fact that the data tenure begins before the address tenure ends) and split-bus transactions to be implemented at the system level. Address pipelining allows new address bus transactions to begin before the current data bus transaction has finished by overlapping the data bus tenure associated with a previous address bus tenure with one or more successive address tenures. Split-bus transaction capability allows the address bus and data bus to have different masters at the same time.

For clarity, the basic functions of address and data tenures will be discussed in somewhat greater detail.

In the case: of address tenure, during address arbitration, address bus arbitration signals are used to gain mastership of the address bus. Assuming the CPU to be the bus master, it then transfers the address on the address bus during the address transfer phase. The address signals, together with certain transfer attribute signals discussed in greater detail hereinafter, control the address transfer. After the address transfer phase, the system uses the address termination phase to signal that the address tenure is complete or that it must be repeated.

In the case of data tenure, during address arbitration, the CPU arbitrates for mastership of the data bus. After the CPU is the bus master, during the data transfer phase, it samples the data bus for read operations or drives the data bus for write operations. Data termination signals occur in the data termination phase. Data termination signals are required after each data beat in a data transfer. In a single-beat-transaction, the data termination signals also indicates the end of the tenure, while in burst accesses, the data termination signals apply to individual beats and indicate the end of the tenure only after the final data beat.

Address-only transfers use only the address bus, with no data transfer involved. This feature is particularly useful in multi-master and multiprocessor environments, where external control of on-chip primary caches and TLB (translation look-aside buffer) entries is desirable. Additionally, the MPC60x provides a retry capability that supports an efficient "snooping" protocol for systems with multiple memory systems (including caches) that must remain coherent.

Pipelining and split-bus transactions, while they do not inherently reduce memory latency, can greatly improve effective bus-memory throughput. The MPC60x bus protocol does not constrain the maximum number of levels of pipelining that can occur on the bus between multiple masters. In a system in which multiple devices must compete for the system bus, external arbitration is required. The external arbiter must control the pipeline depth and synchronization between masters and slaves.

In a traditional pipelined implementation, data bus tenures are kept in strict order with respect to address tenures. However, external hardware can further decouple the address and data buses, allowing the data tenures to occur out of order with respect to the address tenures. Such decoupling requires some form of system tag to associate the out-of-order data transaction with the proper originating address transaction. It has been proposed that individual bus requests and data bus grants from each processor may be used by the system to implement tags to support interprocessor, out-of-order transactions. (*PowerPC 601 RISC Microprocessor User's Manual,* Section 9.2.2, Address Pipelining and Split-Bus Transactions, Motorola Inc., 1993.) No such facility is defined, however, for the MPC601 interface.

SUMMARY OF THE INVENTION

The present invention, generally speaking, provides a system and method of decoupling the address and data buses of a system bus using side band information signals. A computer system with which the invention may be used has a system bus including an address bus and a data bus and has, operatively connected to said system bus, multiple master devices, including a microprocessor, and multiple slave devices. In accordance with one embodiment of the invention, the address bus and the data bus are decoupled by providing, in addition to signals carried by the system bus, first side-band signals including, for each master device besides the microprocessor, an address arbitration signal, and providing, in addition to signals carried by the system bus, second side-band signals including, for each slave device, an address termination signal, a data arbitration signal, and a read-ready signal indicating that a respective slave device has data to present on the system bus. An address arbitration vector is formed, composed of address arbitration signals for the master devices, an address termination vector is formed, composed of address termination signals for the slave devices, and a read-ready vector is formed, composed of read-ready signals for the slave devices. The address arbitration vector and the address termination vector are sampled. Using a queue structure having a front and a rear, pairs of address arbitration and address termination vectors sampled at different sampling times are queued. Given a pair of address arbitration and address termination vectors at the head of the queue structure and a subsequent, corresponding read-ready vector, a data arbitration signal is issued to one of the slave devices and one of the master devices, as a "paired data bus grant."

In accordance with another embodiment of the invention, a computer system includes a printed circuit board, a microprocessor, and a system bus comprising traces on said printed circuit board and including an address bus, a data bus, an address arbitration signal, an address termination signal, and a data arbitration signal, all connected to the microprocessor. Multiple master devices, including the microprocessor, are operatively connected to the system bus, as are multiple slave devices. In addition to signals carried by the system bus, there are provided first side-band signals including, for each master device besides said microprocessor, an address arbitration signal, and second side-band signals including, for each slave device, an address termination signal, a data arbitration signal, and a read-ready signal indicating that a respective slave device has data to present on the system bus. A central arbiter arbitrates access to the system bus between the master devices and the slave devices and includes circuitry for sampling an address arbitration vector composed of address arbitration signals for the master devices and an address termination vector composed of address termination signals for the slave devices; a queue structure having a front and a rear, including circuitry for queuing pairs of address arbitration and address termination vectors sampled at different sampling times; and circuitry for issuing a data arbitration signal to one of the slave devices based on pairs of address arbitration and address termination vectors at the head of the queue structure and based on a read-ready vector composed of read-ready signals for the slave devices.

BRIEF DESCRIPTION OF THE DRAWING

The present invention may be further understood from the following description in conjunction with the appended drawing. In the drawing:

FIG. 7 is a timing diagram showing usage of the ARBus in the case of a CPU read of memory with the bus initially idle.

DETAILED DESCRIPTION OF THE PREFERRED EMBODIMENTS

Figure 2:
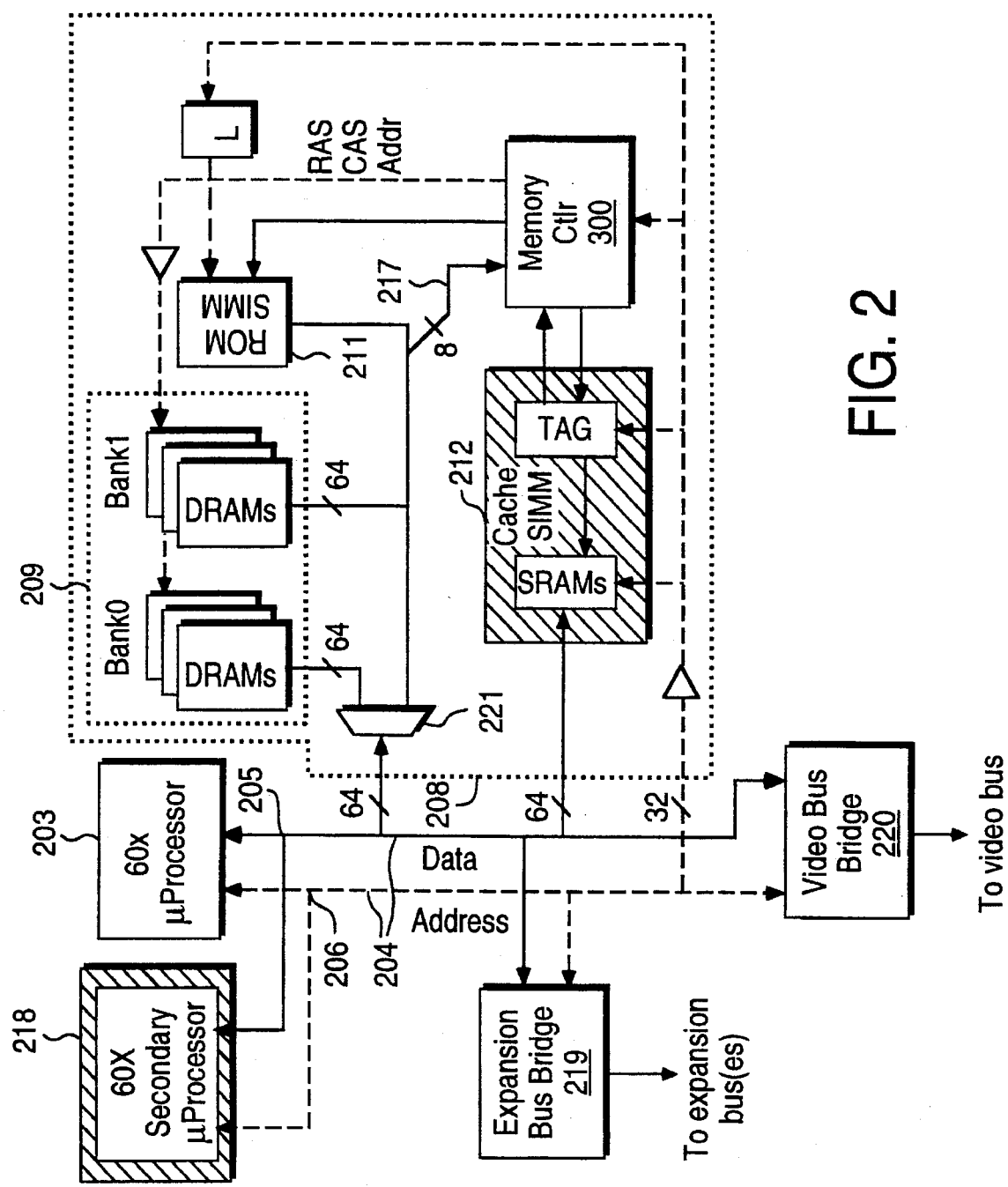
FIG. 2 is a system-level block diagram of a computer system in which the present invention may be used.

Referring now to FIG. 2, the present invention may be used in a computer system of the type shown. A CPU 203

(for example a Power PC 601 microprocessor) is connected to a system bus 204, including a data bus 205, an address bus 206, and a control bus (not shown). A memory subsystem 208 includes, in the illustrated embodiment, a main memory 209, a read-only memory 211, and a level-two cache memory 212. The CPU 203, through the system bus 204, is connected directly to the level-two cache memory 212. The CPU 203 is connected indirectly to the main memory 209 and the read-only memory 211, through a datapath circuit 221 and a memory controller 300. In general, the datapath circuit 221 provides for 64- or 128-bit reads from and writes to memory, in either big-endian or little-endian mode. The memory controller 300 controls the various memory devices within the memory subsystem 208 in response to signals on the system bus 204 and, in particular, provides address and control signals (i.e., RAS and CAS) to the main memory 209. The datapath circuit 221 and the memory controller 300 are connected by a register data bus 217.

Also shown is an optional secondary processor 218 which, like the CPU 203, may be a Power PC 601 microprocessor for example.

The system bus 204 is also connected to an expansion bus bridge 219 (possibly more than one) and, optionally, a video bus bridge 220. In a preferred embodiment, the system bus 204 is a superset of the conventional Power PC 601 microprocessor interface known as the Apple RISC Bus, or ARBus. An expansion bus connected to the expansion bus bridge 219 may be a standard PCI bus. Likewise, a video bus connected to the video bus bridge 220 may be a PCI-like bus.

Figure 3:
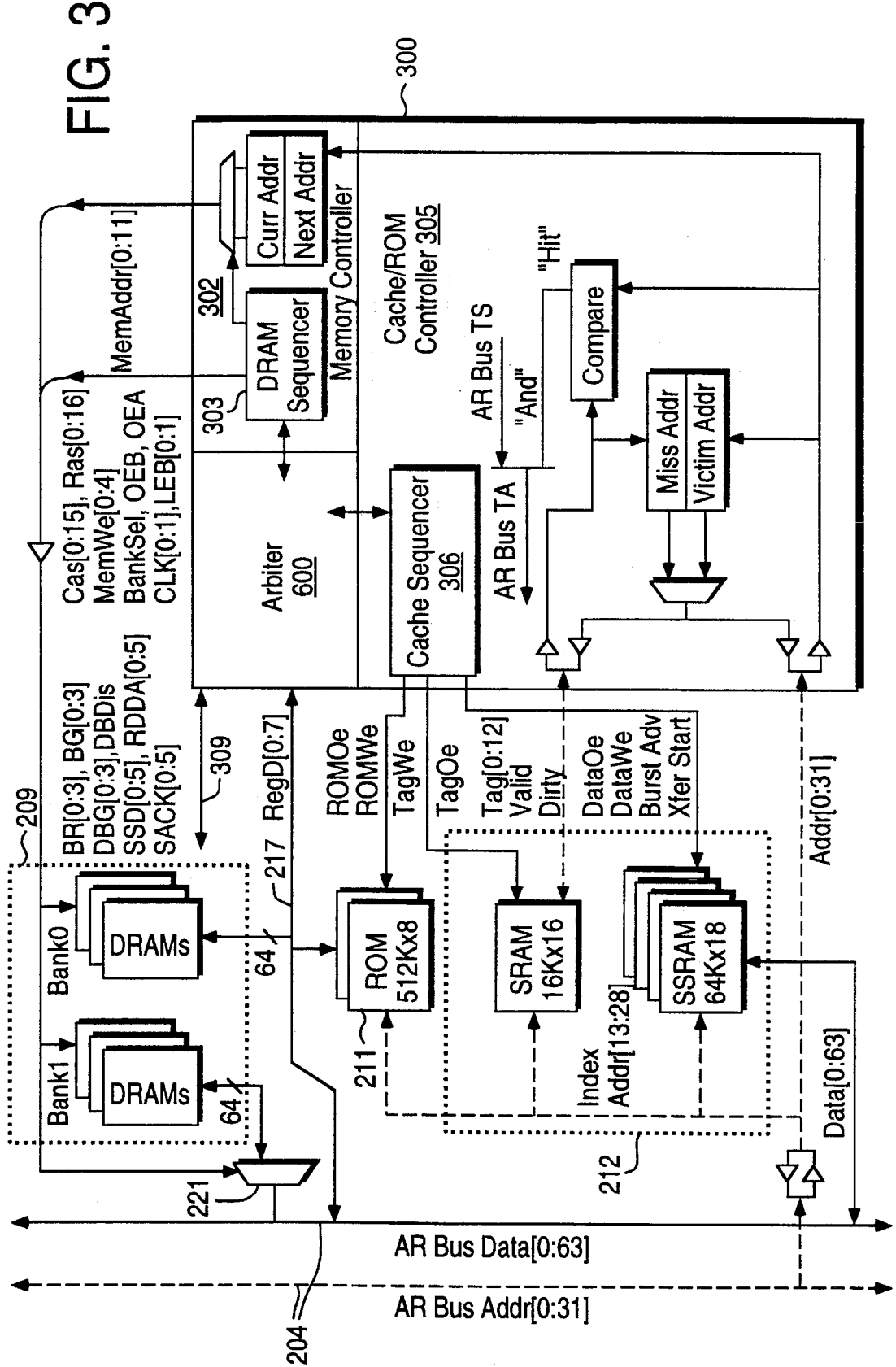
FIG. 3 is a block diagram of the memory controller 300 of FIG. 2.

Referring to FIG. 3, the memory subsystem 208 including the memory controller 300 of FIG. 2 are shown in greater detail, with particular emphasis on the various signals input to and output from the memory controller 300. The memory controller 300 includes a main memory controller 302, a cache/ROM controller 305, and an arbiter 600. The main memory controller 302 produces address and control signals for the main memory 209 and includes a DRAM sequencer 303 and certain memory address logic. The cache/ROM controller 305 produces control signals for the level-two cache memory 212 and the read-only memory 211 and includes a cache/ROM sequencer 306 and certain cache logic. Both the main memory controller 302 and the cache/ROM controller 305 exchange control signals with the arbiter 600, which executes overall control of the memory controller 300 and which is more particularly the subject of the following description.

The arbiter 600 includes a register file (not shown) that may be written and read by the CPU 203 across the register data bus 217. The register file includes, in addition to numerous base address registers, various ID, configuration and timing registers. The particulars of these registers are not essential to an understanding of the present invention and will not be further described. The arbiter 600 inputs various control signals from and outputs various control signals to a control bus 309. Some of the control signals carried by the control bus 309 are part of the conventional PowerPC 601 microprocessor interface. The majority of the signals carried by the control bus 309, however, are sideband information signals used in accordance with the present invention to independently control the address bus 206 and the data bus 205.

Prior to describing in detail the manner in which these side-band information signals am used to decouple the address bus 206 and the data bus 205, it will be useful to consider what is termed herein conventional usage of the PowerPC 601 microprocessor interface.

Figure 1:
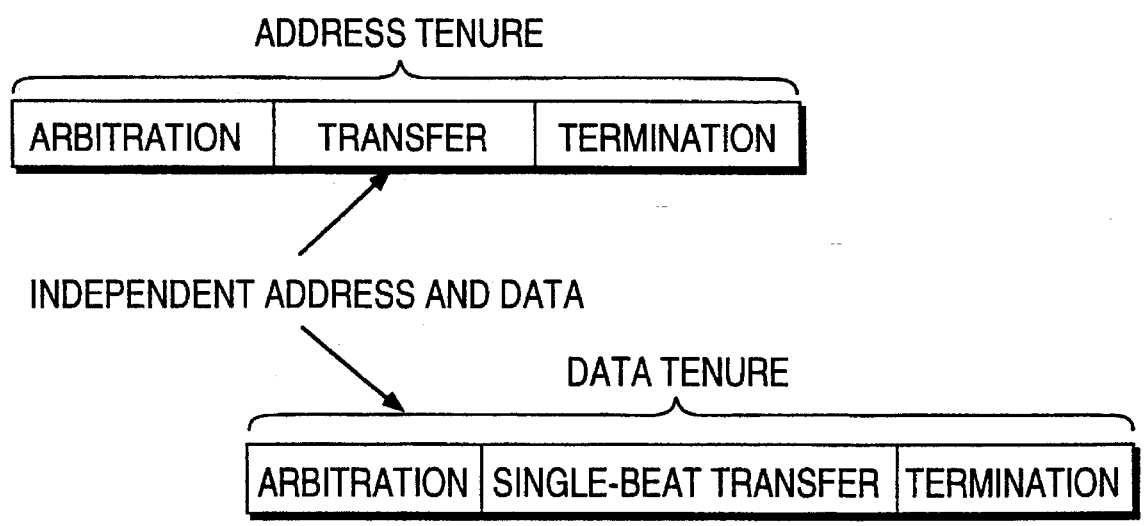
FIG. 1 is a diagram illustrating overlapping tenures for a single-beat transfer on a conventional MPC601 bus.
Figure 4:
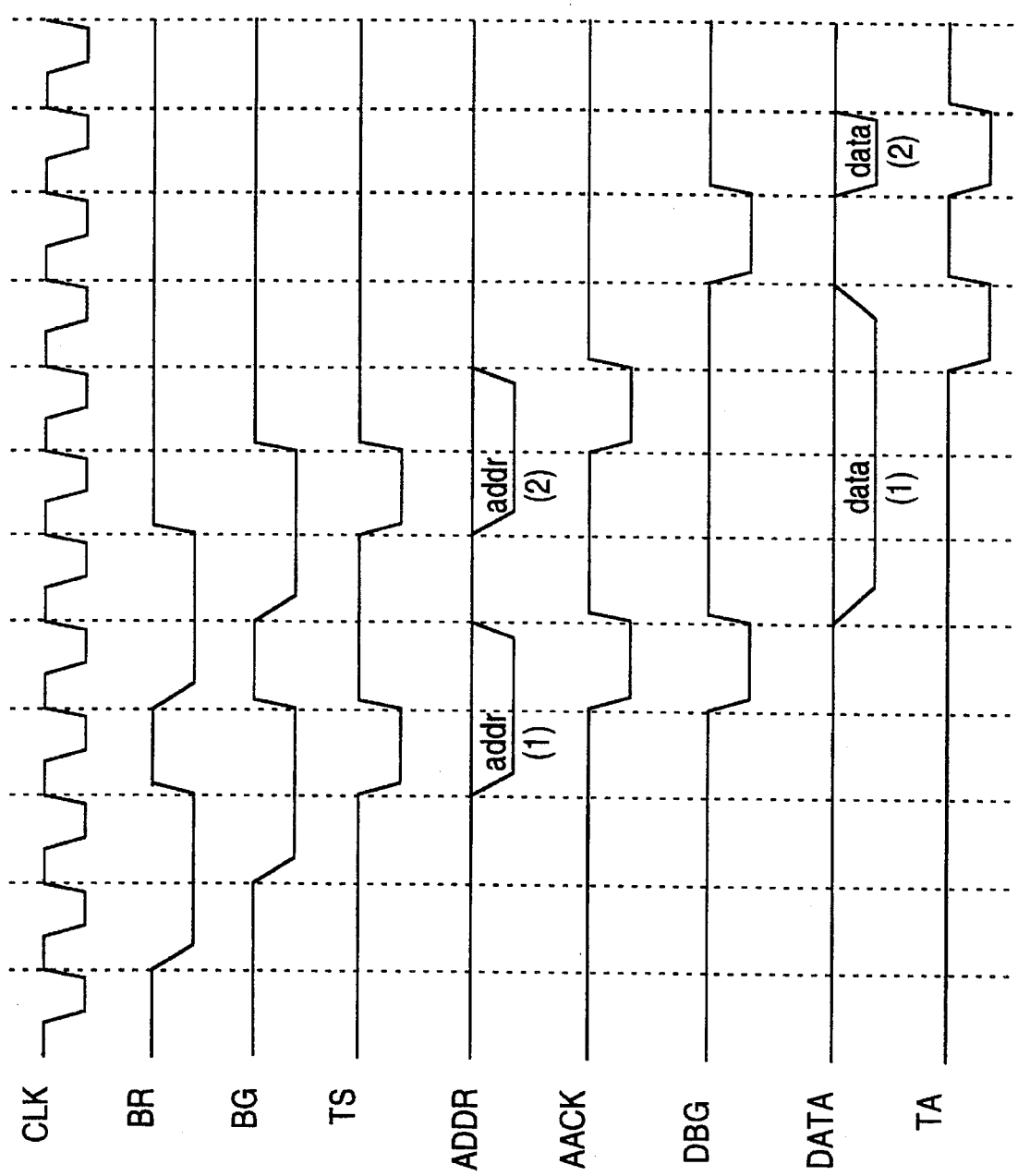
FIG. 4 is a timing diagram showing conventional usage of the MPC601 bus.

As shown in FIG. 1, address tenure and data tenure both have arbitration, transfer and termination phases. Each of these phases involves the exchange of respective handshaking signals. Referring to FIG. 4, the handshaking signals that characterize the address arbitration phase are a bus request signal BR and a bus grant signal BG. The bus request signal BR is an output signal of the CPU 203. The bus grant signal is an input signal of the CPU 203 and is output by the arbiter 600. Both the bus request signal BR and the bus grant signal BG relate to the address bus 206. When the CPU 203 has received the bus grant signal BG, it is free to enter the address transfer phase.

During the address transfer phase, a transfer start signal TS is asserted by the CPU 203 when the CPU 203 begins to drive the address bus 206. The address is decoded by a slave device corresponding to that address, i.e., falling within the device's assigned address space. During the address termination phase, the slave device asserts the: address acknowledge signal AACK after it has sampled the address on the address bus 206.

During the address transfer phase, certain transfer attribute signals are used indicate the nature of transaction, including whether the transaction is an address-only transaction. Assuming that the transaction is not, then the transfer start signal TS is treated by the arbiter 600 as an implicit data bus request, starting the data arbitration phase. Following assertion of the acknowledge signal AACK, a data bus grant signal DBG is asserted by the arbiter 600 once the data bus 205 is available for use by the CPU 203. The CPU 203 may then begin the data transfer phase on the next cycle by driving the data bus 205. During a subsequent data termination phase, the slave device asserts a transfer acknowledge signal TA after it has sampled the data on the data bus 205.

The foregoing sequence of operations is repeated for a second subsequent transaction. In FIG. 4, the transaction to which address and data information pertain is indicated in parentheses, i.e., transaction (1) and transaction (2).

Note that in FIG. 4, address tenures and data tenures, although they may be pipelined, are tightly ordered. That is, data bus tenure on the system is granted in the same order as address tenure is granted even if the address tenures are granted to different masters. In precise terms, if TS(n) is for Master A and TS(n+1) is for Master B, then DBG(n) will be for Master A and DBG(n+1) will be for Master B.

This tight ordering of the conventional MPC601 bus may result in considerable system performance degradation, especially as bus speed increases. A read transaction to an expansion-bus device, for example, will typically be high-latency as compared to a main-memory read transaction. Tight ordering of address and data tenures results in such latency impacting the data bus. That is, even though another transaction might be ready to use the data bus first, during the latency period, it cannot because of the right ordering of address and data tenures. If a system is to handle information streams having real-time constraints, such as video streams, it is important to ensure that the data bus is not unavailable for use during substantial periods of time; otherwise real-time deadlines may be missed, resulting in objectional artifacts during presentation.

The present invention decouples address and data tenures such that data bus utilization is increased. This increase in data bus utilization allows for higher real-time performance to be achieved. In particular, the present invention allows for a true split-bus architecture with ordered slaves and ordered masters. "Ordered," in one usage, means each master and each slave has its own independent FIFO structure supporting "ordered" service to transactions posted to it. If a slave receives three transactions A, B, and C, then it will respond to A first, B second, and C third. If a master performs transactions D, E, and F, then it expects servicing of those transactions in the order of D first, E second, and F third. In one embodiment, there can be up to three outstanding master/slave pair transactions at one time.

Referring briefly again to FIG. 3, the side-band information signals carried by the control bus 309 are side-band information signals used in accordance with the present invention to decouple the address bus 206 and the data bus 205. These side-band information signals include, in addition to the bus request signal BR, the bus grant signal BG and the data bus grant signal DBG of FIG. 4, corresponding signal for each master besides the CPU 203.

In one embodiment, the system includes, besides the CPU 203, four additional masters for up to a total of five masters: the CPU 203, the secondary processor 218 (if present), the expansion bus bridge 219, one additional expansion bus bridge (if present), and the video bus bridge 220 (if present). The control bus 309 therefore carries five bus request signals BR[0:4], five bus grant signals BG[0:4], and five data bus grant signals DBG[0:4].

In the same embodiment, the system includes six slaves: the expansion bus bridge 219 (also a master), the additional expansion bus bridge (also a master, if present), the video bus bridge 220 (also a master, if present), the main memory 209, the read-only memory 211, and memory controller registers accessible via the register data bus 217. For each slave, the control bus 309 carries three signals: a slave acknowledge signal SACK, a read data available signal RDDA, and a source- or sink-data signal SSD. The control bus 309 therefore carries six slave acknowledge signals SACK[0:5], six read data acknowledge signals RDDA[0:5], and six source- or sink-data signals SSD[0:5].

Figure 5:
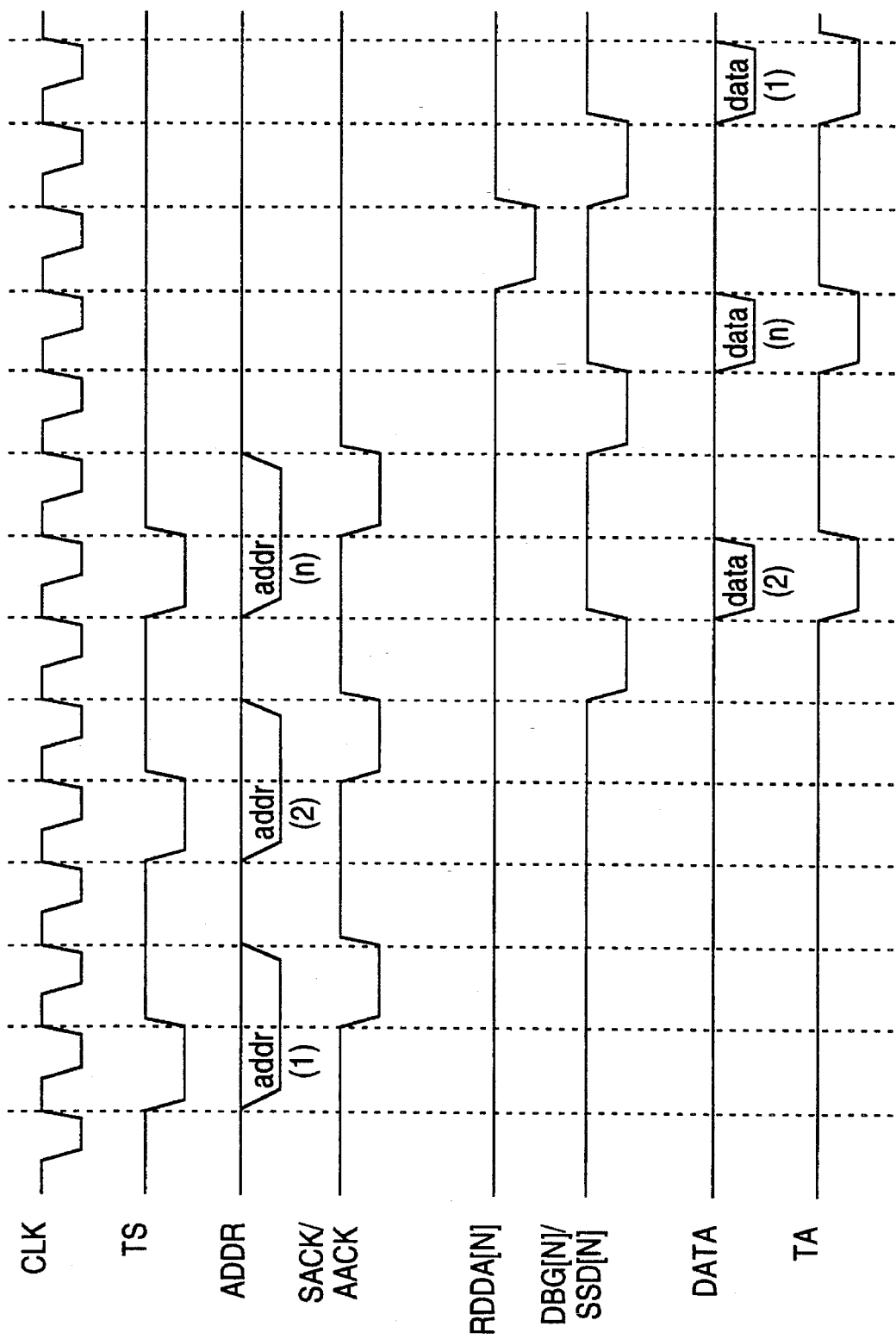
FIG. 5 is a timing diagram showing usage of the ARBus (a superset of the MPC601 bus) in accordance with the present invention.

The manner in which the foregoing signals are used to decouple address tenures and data tenures may be appreciated with reference to FIG. 5. For simplicity, the address arbitration phase has not been illustrated. The address transfer phase is essentially the same as in the conventional case. The address termination phase, however, differs. The addressed slave asserts the AACK signal in the conventional manner, the AACK signal being used by the master. In parallel with AACK, the addressed slave generates a SACK signal for use by the arbiter 600. The arbiter uses this information about which slave has acknowledged in order to reorder transactions on the system bus 204.

In the data arbitration phase, the data bus is granted to masters based on a priority ordering of masters, and is granted to slaves based in part on the priority of the master of the transaction and in part on the availability of data from the slave. What may be considered in effect two sets of grant signals are therefore defined, DBG[0:#Masters-1] for masters and SSD[0:#Slaves-1] for slaves.

Assume, for example, that in FIG. 5 the first transaction is a read by the CPU 203 from the expansion bus bridge 2 19 and that the second and third transactions are writes to memory from the video bus bridge 220. In general, video transactions will be assigned a higher priority than transactions by the CPU 203 because of the real-time requirements of video transactions. Data bus grant signals are therefore issued to video bus bridge 220 for the first video transaction (2), which proceeds through the data transfer phase, and the second video transaction (n), which also proceeds through the data transfer phase. The CPU 203 will not be issued a data bus grant signal for its read from the expansion bus bridge 219 until a read data available signal has been returned to the arbiter 600 from the expansion bus bridge 219. Then, the CPU 203 will be issued a data bus grant signal for its read and the expansion bus bridge 2 19 will simultaneously be issued a corresponding slave source-data signal causing it to present its data on the data bus 205 to be sampled by the CPU 203.

As may be appreciated from the foregoing description, the data arbitration phase in accordance with the present invention is very different than in the conventional case. This different manner of operation allows address and data tenures to be decoupled, increasing utilization of the data bus. The data transfer and data termination phases, however, are essentially the same as in the conventional case.

Transaction reordering is controlled by the arbiter 600. The general characteristics of the arbiter 600 will first be described, after which the arbiter 600 will be described in greater detail.

The basic behavior that the arbiter 600 guarantees is as follows:

Any given ARBus master has its own address and data tenures strictly ordered. That is, DBG(n) always corresponds to TS(n) and for a set of TS(n) and TS(n+1), DBG(n) will always occur before DBG(n+1).

Any given ARBus slave has its own data tenures strictly ordered. That is, SSD(n) always corresponds to TS(n) and for a set of TS(n) and TS(n+1), SSD(n) will always occur before SSD(n+1).

Data bus tenure is not necessarily granted on the ARBus in the same order as address tenure is granted if the address tenures are granted to different masters. That is, if TS(n) is for Master A and TS(n+1) is for Master B, DBG(n) may be for Master B and therefore DBG(n+1) for Master A.

In the illustrated embodiment, the arbiter 600 supports five logical masters. The five masters arbitrate for use of the bus in accordance with a fixed priority as follows: the video bus bridge 220, the expansion bus bridge 219, an additional expansion bus bridge (if present), the CPU 203, and the secondary processor 218. By giving highest priority to the video bus bridge 220, the arbiter 600 allows the video bus bridge 220 to "hog" the ARBus.

The arbiter 600 may optionally "park" the CPU 203 or the video bus bridge 220 on the ARBus by asserting the appropriate BG wire during idle bus cycles. The default mode of operation is to park the most recent master.

Address bus arbitration occurs in every cycle that an address tenure is not active. Masters assert their individual bus request signals (BR) to the arbiter 600 to signal a request for service. The arbiter 600 signals the master which has won the arbitration by asserting bus grant (BG). Masters that have BG asserted in a given cycle are free to assert TS and therefore start a transaction in the next cycle. Address bus arbitration may be performed in accordance with a routine set forth in Appendix A.

The arbiter 600 controls the use of the data signals as a function of the address and the availability of read data. If a given ARBus address receives an AACK, the arbiter 600, by sampling the SACK signals, knows which slave will accept write data or will return read data. A slave that asserts AACK for a write transaction gives implicit permission to the arbiter 600 to grant the data bus to the master and allow it to assert the associated write data. Slaves must assert RDDA when requested return read data is available.

The arbiter 600 grants the data bus to a selected master via the assertion of DBG (Data Bus Grant) and indicates to the slave that data is to be asserted or accepted via the assertion of SSD (Source or Sink Data). Data bus arbitration may be performed in accordance with a routine set forth in Appendix B.

Transactions which do not involve a data transfer (Address-Only transactions) are typically generated by the CPU 203 or the secondary processor 218 and am simply acknowledged (AACK asserted) by the arbiter 600.

Figure 6:
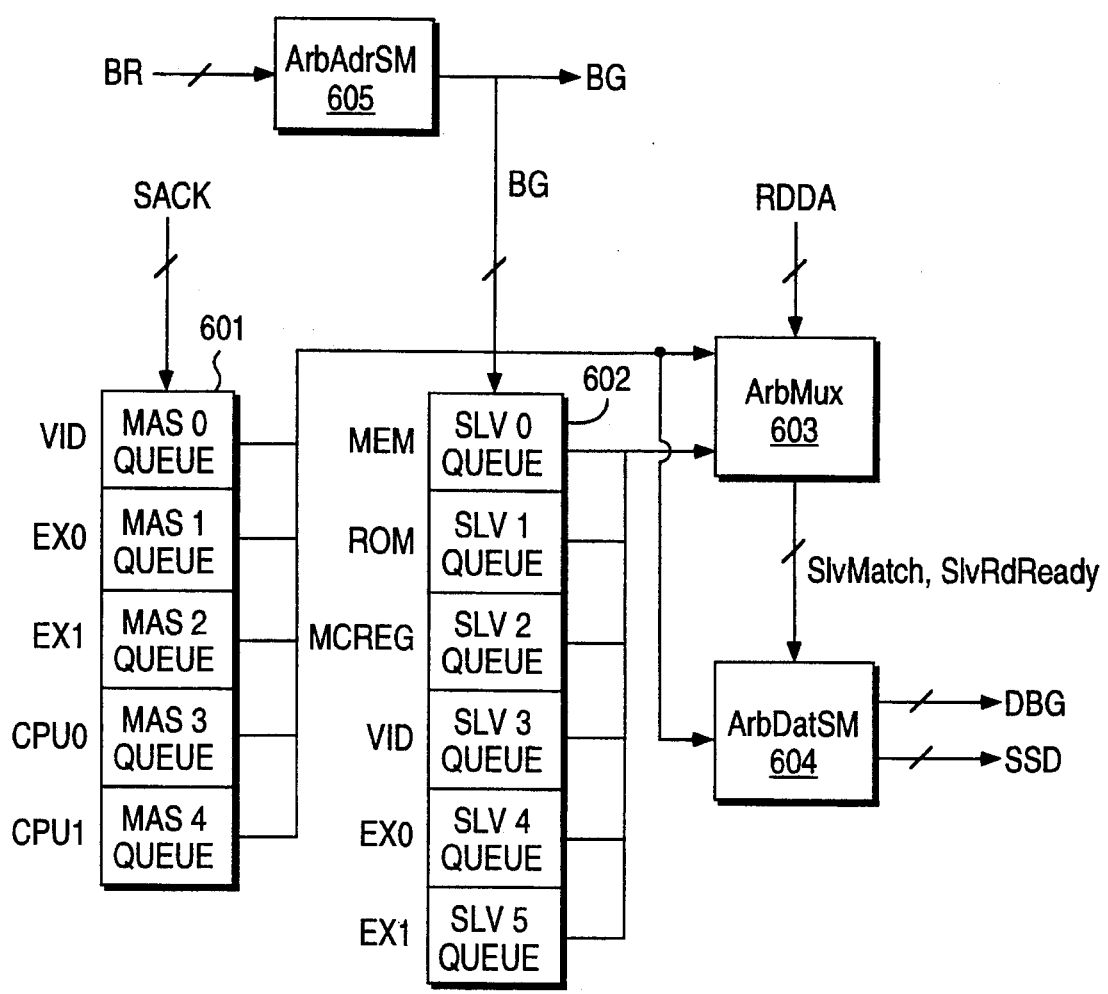
FIG. 6 Is a block diagram of the arbiter 600 of FIG. 3.

Referring now to FIG. 6, the arbiter 600 will be described in greater detail. The arbiter 600 includes master queues 601, one for each master in the system, and slave queues 602, one for each slave in the system. Each of the master queues 601 are connected at their respective data inputs to a SACK vector composed of the slave acknowledge signals SACK of each of the slaves, in addition to a Rd/Wr signal. Hereinafter, the term "SACK vector" will be understood to mean signals including she slave acknowledge signals SACK of each of the slaves and the Rd/Wr signal. Each of the slave queues 602 are connected at their respective data inputs to a BG vector composed of the bus grant signals BG of each of the masters. (In more precise terms, the BG vector is the physical bus grant signals sampled in the cycle that the TS signal is asserted.) The bus grant signals BG are produced by an address bus arbiter state machine 605 in response to the bus request signals BR of each of the masters.

Each time the address acknowledge signal AACK is presented on the system bus 204, the master queues 601 and the slave queues 602 are updated by pushing the SACK vector onto one (and only one) of the master queues 601 and pushing the BG vector onto one (and only one) of the slave queues 602. In particular, the SACK vector is pushed onto one of the master queues 601 identified by the BG vector, and the BG vector is pushed onto one of the slave queues 602 identified by the SACK vector.

The SACK vectors at the heads of the master queues 601 and the BG vectors at the heads of the slave queues 602 are input to an arbiter multiplexer 603. The arbiter multiplexer 603 looks at the SACK vectors at the head of the master queues 601 and determines which of the slave queues 602 designated by the SACK vectors have at their heads a BG vector that designates the reciprocal one of the master queues 601. On the next data tenure of the masters for which this condition is satisfied, data will be sourced from the corresponding slave. The arbiter multiplexer 603 also receives a read-ready vector RDDA composed of the read data acknowledge signals RDDA of each of the slaves.

Based on the foregoing input signals, the arbiter multiplexer 603 produces a slave match vector SlvMatch and a slave read ready vector SlvRdReady. The slave match vector SlvMatch designates those masters finding matching slaves, i.e., slaves expecting to next respond to transactions from those respective masters. The slave read ready vector SlvRdReady identifies, of those masters, which have slaves that are actually ready to source data. The slave match vector SlvMatch and the slave read ready vector SlvRdReady are input to a data bus arbiter state machine 604.

The SACK vectors at the heads of the master queues 601 are also input to the data bus arbiter state machine 604. The data bus arbiter state machine 604 determines which transaction is ready to go by examining the bits of the SlvMatch vector in priority order and, if a bit indicates a matching master/slave pair, determining further whether either the transaction is a write transaction (by examining the Rd/Wr bits at the front master queue entries) or the corresponding bit in the SlvRdReady vector is set, indicating that the slave is ready to source data. In Verilog notation, the data bus arbiter state machine 604 computes a vector TransReady as follows:

TransReady[0:4]=SlvMatch[0:4]& ({5{Write}}||SlvRdReady[0:4])

Based on the computed TransReady vector, the data bus arbiter state machine 604 asserts a corresponding one of the data bus grant signals DBG. The data bus arbiter state machine 604 also asserts a corresponding one of the source-or-sink-data signals SSD, in accordance with the SACK vector at the front of the winning master queue.

Operation of the arbiter 600 may be further understood from the following illustrative examples.

To take a relatively simple example, assume that Master 1 (the expansion bus bridge 2 19) issues a read transaction to Slave 3 (the video bus bridge 220). Slave 3, when it is ready to service the transaction, asserts the AACK signal on the ARBus and, at the same time, generates a SACK signal to the arbiter 600 identifying Slave 3. When the arbiter 600 receives the AACK signal, the SACK vector is pushed onto one of the master queues 601 based on the BG vector. At the same time, the BG vector is pushed onto one of the slave queues 602 based on the SACK vector. Assuming that no other transactions are presently queued, a SACK vector value representing Slave 3 (for example b111011) will appear at the head of the one of the master queues 601 for Master 1, and a BG vector value representing Master 1 (for example b10111) will appear at the head of the one of the slave queues 602 for Slave 3. The arbiter multiplexer 603 will therefore cause the SlvMatch vector to have a value indicating a match for Master 1 (for example b01000). When Slave 3 is ready with read data, it will assert its RDDA signal, in response to which the arbiter multiplexer 603 will cause the SlvRdReady vector to have a value indicating the readiness of Slave 3 to respond to Master 1 (for example b01000). If no other transactions having higher priority have in the meantime become ready to go, the data bus arbiter state machine 604 will then issue a data bus grant signal DBG to Master 1 and a sink/source data signal SSD to Slave 3, and the data transfer phase of the transaction will proceed.

To take another, more complex example, assume that after Master 1 has issued the foregoing transaction request (shown below as Transaction 1) but before Slave 3 has responded with an RDDA signal, a series of further transactions is issued, in accordance with the following chronological sequence:

1. Master 1 Rd Slave 3
2. Master 3 Wr Slave 3
3. Master 3 Wr Slave 0
4. Master 4 Rd Slave 1
5. Master 2 Wr Slave 4

Note that transactions 1 and 2 both involve Slave 3, and transactions 2 and 3 both involve Master 3. Because masters and slaves are ordered, data dependencies are created. That is, transaction 2 cannot complete until transaction 1 has completed. Similarly, transaction 3 cannot complete until transaction 2 has completed. Transactions 4 and 5, on the other hand, have no data dependencies. Transaction 4 is a read from Master 4 (CPU 1) to Slave 1 (ROM). In the case of ROM and RAM, because read latency is minimal and is known in advance, the RDDA signals for ROM and RAM are tied permanently asserted.

Transaction 2, Master 3's write of Slave 3, is queued up behind Master 1's read of Slave 3. Transaction 3, Master 3's write of Slave 0, is queued up behind Master 3's write of Slave 3. When transaction 4 is queued, there are matching queue entries at the head of the master and slave queues for transactions 1 and 4. Transaction 1, however, is a read transaction and is not allowed to proceed until an RDDA is received from Slave 3 (while RDDA from Slave 1 is permanently asserted as previously mentioned).

Therefore, the arbiter 600 first grants the data bus to Master 4 and Slave 1 for transaction 4. When transaction 5 is queued, there are matching queue entries at the head of the master and slave queues for transactions 1 and 5. Assume, however, that an RDDA has still not been received from Slave 3. The arbiter 600 will then grant the data bus to Master 2 and Slave 4 for transaction 5.

Assume now that an RDDA is received from Slave 3. Transactions 1, 2 and 3 will then, in that order, be granted the bus and will complete. In the foregoing example, whereas the address order of the transactions is 1, 2, 3, 4, 5, the data order is 4, 5, 1, 2, 3.

Additional details concerning the arbiter 600 may be found in copending U.S. application Ser. No. 08/432,622 entitled "Deadlock Avoidance in a Split-Bus Computer System," filed concurrently herewith (Attorney's Docket No. P1473/134), incorporated herein by reference. Additional details concerning the video bus bridge 220 may be found in copending U.S. application Ser. No. 08/432,621 also entitled "Deadlock Avoidance in a Split-Bus Computer System," filed concurrently herewith (Attorney's Docket No. P 1661/179), also incorporated herein by reference.

When the system it totally idle, i.e., the data bus is not busy and all queues are empty, a memory read transaction is executed immediately without queuing the transaction. FIG. 7 illustrates the timing of such a transaction. After the memory address has been placed on the address bus 206, if the address is a memory address, the arbiter 600 will receive a SACK from memory. However, the arbiter will decode the memory address in parallel, allowing it to assert SSD and DBG without having to wait for the SACK assertion from memory. This is advantageous in the case of a read hit in the cache 212, in which case data can be transfered two cycles after TS. If the system is totally idle and an access to memory is initiated, the main memory controller 302 forms a memory row address and applies the memory address to the memory. The main memory controller 302 then produces a RAS signal, strobing the row address signal into the memory. Then, the main memory controller 302 forms a memory column address and applies the memory address to the memory.

On following cycle, the main memory controller 302 produces a CAS signal, strobing the column address signal into the memory. The memory places data on the data bus 205, and the main memory controller 302 produces a TA signal for the memory. The CAS signal is then raised, after which another column address may be applied to the memory to read a further data word, etc.

The capability of triggering CPU memory reads without requiring them to be queued increases overall bus performance still further beyond the performance level attainable through split-bus operation.

The described methods and apparatus therefore allow a high-performance bus to be realized. By supporting a true split-bus architecture with ordered slaves and ordered masters, bus performance may be dramatically increased without the necessity of complex logic in bus masters and bus slaves. This increase in performance is particularly important in the case of systems providing support for real-time data streams such as video streams.

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

```
                         Appendices-ARBus Arbiter
APPENDIX: Address Bus Arbitration Algorithm
    function [0:4] CalcBG;
        input [0:4]   BR;
        input [0:4]   OldBG;
        input         ParkMode;
        input [0:2]   ParkVal;
        if (&BR) begin
            if (!ParkMode) CalcBG = OldBG;
            else case (ParkVal)                  // synopsys full_case parallel_case
                2'b000: CalcBG = 5'b01111;           // VIDEO
                2'b001: CalcBG = 5'b10111;           // EXPANSION 1
                2'b010: CalcBG = 5'b11011;           // EXPANSION 2
                2'b011: CalcBG = 5'b11101;           // CPU0
                2'b100: CalcBG = 5'b11110;           // CPU1
            endcase
        end else casex (BR)                      // synopsys full_case parallel_case
            5'b0xxxx: CalcBG = 5'b01111;             // VIDEO
            5'b10xxx: CalcBG = 5'b10111;             // EXPANSION 1
            5'b110xx: CalcGB = 5'b11011;             // EXPANSION 2
            5'b1110x: CalcBG = 5'b11101;             // CPU0
            5'b11110: CalcBG = 5'b11110;             // CPU1
        endcase
    endfunction
APPENDIX B: Data Bus Arbitration Algorithm
    (a pseudo-code summary is more appropriate here)
        •if at least one master queue is non-empty
            •select the highest priority non-empty master queue,
              based upon the following priority encoding:
                    0:   VIDEO          (Highest)
                    1:   EXPANSION 1
                    1:   EXPANSION 2
                    2:   CPU 0
                    3:   CPU 1          (Lowest)
            •upon examining the selected master queue to see which
```

```
                    Appendices-ARBus Arbiter
       slave is selected in the front entry, look at the front
       entry of the associated slave queue to see if it
       points back to the selected master. If it does,
       a master/slave match occurs.
         •if a master/slave match has occurred, grant the data bus
         to the selected master (via DBG) and slave (via SSD).
           Otherwise, remain idle.
         •otherwise remain idle
```

What is claimed is:

1. A method of increasing bus utilization in a computer system having a system bus including an address bus and a data bus and having, operatively connected to said system bus, a plurality of master devices and a plurality of slave devices, said method comprising the steps of:

providing a first plurality of signals including, for each master device an address arbitration signal;

providing a second plurality of signals including, for each slave device, a data arbitration signal, and a read-ready signal indicating that a respective slave device has data to present on the system bus;

providing a third plurality of signals including, for each slave device, an address termination signal;

forming an address arbitration vector composed of address arbitration signals for said master devices, an address termination vector composed of address termination signals for said slave devices, and a read-ready vector composed of read-ready signals for said slave devices;

sampling said address arbitration vector and said address termination vector;

using a queue structure having a front and a rear, queuing address arbitration and address termination vectors; and issuing a data arbitration signal to one of said slave devices based on address arbitration and address termination vectors at the head of the queue structure and based on said read-ready vector.

2. The method of claim 1, wherein said queuing step comprises providing separate master queues for each of said masters and providing separate slave queues for each of said slaves.

3. The method of claim 2, wherein said queuing step further comprises queuing said address termination vector in one of said separate master queues determined by said address arbitration vector.

4. The method of claim 3, wherein said queuing step further comprises queuing said address arbitration vector in one of said separate slave queues determined by said address termination vector.

5. The method of claim 4, wherein said issuing step comprises issuing said data arbitration signal to a matching one of said slave devices a separate slave queue of which has at a head thereof an address arbitration vector identifying one of said masters, a separate master queue of which in turn has at a head thereof an address termination vector identifying said one of said slaves.

6. The method of claim 5, wherein said issuing step further comprises delaying issuing said data arbitration signal to said one of said slave devices until said read-ready vector indicates that said slave device has data to present on the system bus.

7. The method of claim 5, wherein providing said first plurality of signals further comprises providing, for each master device, a data arbitration signal, and wherein said issuing step further comprises issuing a data arbitration signal to a matching one of said master devices a separate master queue of which has at a head thereof an address termination vector identifying one of said slaves, a separate slave queue of which in turn has at a head thereof an address arbitration vector identifying said one of said masters.

8. The method of claim 7, wherein said system bus includes at least one transfer type, signal whereby each of said address arbitration signals is associated with one of a read transaction and a write transaction, said issuing step comprising the further steps of:

distinguishing between read transactions and write transactions;

establishing a priority of said master devices; and for write transactions, if there are multiple matching ones of said master devices, issuing data arbitration signals to said multiple matching ones of said master devices in order of said priority.

9. The method of claim 8, wherein said priority is fixed.

10. The method of claim 1, wherein the computer system further comprises a microprocessor operatively connected to the system bus, and wherein the first and second pluralities of signals are side-band signals not connected to the microprocessor.

11. A method of increasing bus utilization in a computer system having a system bus including an address bus and a data bus and having, operatively connected to said system bus, a plurality of master devices and a plurality of slave devices, said method comprising the steps of:

providing a first plurality of signals including, for each master device an address arbitration signal;

establishing a priority of said master devices;

providing a second plurality of signals including, for each slave device, a data arbitration signal;

providing a third plurality of signals including, for each slave device, an address termination signal;

forming an address arbitration vector composed of address arbitration signals for said master devices, an address termination vector composed of address termination signals for said slave devices;

sampling said address arbitration vector and said address termination vector;

using a queue structure having a front and a rear, queuing address arbitration and address termination vectors; and issuing a data arbitration signal to one of said slave devices based on address arbitration and address termination vectors at the head of the queue structure and based on said priority.

12. The method of claim 11, wherein the computer system further comprises a microprocessor operatively connected to the system bus, and wherein the first and second pluralities of signals are side-band signals not connected to the microprocessor.

13. A computer system comprising:

a system bus including an address bus and a data bus;

a plurality of master devices operatively connected to said system bus;

a plurality of slave devices operatively connected to said system bus;

a first plurality of signals including, for each master device, an address arbitration signal;

a second plurality of signals including, for each slave device, a data arbitration signal, and a read-ready signal indicating that a respective slave device has data to present on the system bus;

a third plurality of signals including, for each slave device, an address termination signal;

a central arbiter for arbitrating access to the system bus between said master devices and said slave devices, said arbiter comprising:

means for sampling an address arbitration vector composed of address arbitration signals for said master devices and an address termination vector composed of address termination signals for said slave devices;

a queue structure having a front and a rear, including means for queuing address arbitration and address termination vectors; and means for issuing a data arbitration signal to one of said slave devices based on address arbitration and address termination vectors at the head of the queue structure and based on a read-ready vector composed of read-ready signals for said slave devices.

14. The system of claim 13, wherein the computer system further comprises a microprocessor operatively connected to the system bus, and wherein the first and second pluralities of signals are side-band signals not connected to the microprocessor.

15. A computer system comprising:

a system bus including an address bus and a data bus a plurality of master devices operatively connected to said system bus;

a plurality of slave devices operatively connected to said system bus;

a first plurality of signals including at least one signal for each master device;

a second plurality of signals including at least first and second side-band signals for each slave device;

a central arbiter for arbitrating access to the system bus between said master devices and said slave devices, said arbiter comprising:

means for sampling said first plurality of signals to produce a first signal vector and for sampling said second plurality of signals to produce second and third signal vectors;

a queue structure having a front and a rear, including means for queuing said first and second signal vectors; and means for issuing a data arbitration signal to one of said slave devices based on said first and second signal vectors at the head of the queue structure and based on said third signal vector.

16. The system of claim 15, wherein the computer system further comprises a microprocessor operatively connected to the system bus, and wherein the first and second pluralities of signals are side-band signals not connected to the microprocessor.

* * * * *